United States Patent
Dombkowski et al.

(10) Patent No.: US 6,898,280 B1
(45) Date of Patent: May 24, 2005

(54) LINE CARD AND METHOD FOR SUPPORTING POTS, ASYMMETRIC DSL AND SYMMETRIC DSL SERVICES

(75) Inventors: Kevin Eugene Dombkowski, Oswego, IL (US); Carl Robert Posthuma, Wheaton, IL (US)

(73) Assignee: Lucent Technologies Inc., Murray Hill, NJ (US)

(*) Notice: Subject to any disclaimer, the term of this patent is extended or adjusted under 35 U.S.C. 154(b) by 754 days.

(21) Appl. No.: 09/713,745

(22) Filed: Nov. 15, 2000

(51) Int. Cl.[7] ............................................... H04M 1/00
(52) U.S. Cl. ........................... 379/399.01; 379/390.02; 379/390.04; 379/402
(58) Field of Search ....................... 379/390.02, 390.04, 379/399.01, 399.02, 402, 413.02; 375/220, 219

(56) References Cited

U.S. PATENT DOCUMENTS

| | | | | |
|---|---|---|---|---|
| 6,067,316 A | * | 5/2000 | Amrany et al. | 375/220 |
| 6,226,356 B1 | * | 5/2001 | Brown | 379/24 |
| 6,295,343 B1 | * | 9/2001 | Hjartarson et al. | 379/93.05 |
| 6,466,088 B1 | * | 10/2002 | Rezvani et al. | 330/51 |
| 6,480,487 B1 | * | 11/2002 | Wegleitner et al. | 370/354 |
| 6,512,739 B1 | * | 1/2003 | Heidari et al. | 370/210 |
| 6,640,239 B1 | * | 10/2003 | Gidwani | 709/203 |
| 6,661,894 B1 | * | 12/2003 | Heise | 379/399.01 |
| 6,693,916 B1 | * | 2/2004 | Chaplik et al. | 370/485 |
| 6,728,370 B1 | * | 4/2004 | Anderson et al. | 379/398 |

FOREIGN PATENT DOCUMENTS

EP            0849928            6/1998

* cited by examiner

*Primary Examiner*—Curtis Kuntz
*Assistant Examiner*—Tuan Pham

(57) ABSTRACT

A line card and method is provided which supports symmetric and asymmetric telecommunication services, such as symmetric and asymmetric DSL services. The line card may support concomitantly POTS and asymmetric DSL services or support DSL services. A xDSL interface provides processing for DSL signals and a POTS interface provides processing for POTS signals. The line card is capable of switching operating modes or which services it is supporting. Preferably, the line card is capable of switching operating modes during a communication session. The line card may switch modes based on instructions received from external devices, such as CPE or far end equipment, based on preprogrammed software or based on operation of the line card.

24 Claims, 3 Drawing Sheets

LINE CARD AND METHOD FOR SUPPORTING POTS, ASYMMETRIC DSL AND SYMMETRIC DSL SERVICES

BACKGROUND OF THE INVENTION

The present invention relates generally to telecommunications systems for providing data and voice communications and, in particular, to a line card and method which supports POTS and asymmetric DSL and which supports DSL.

There is an ever pressing need for telecommunication service providers to provide cheaper, faster and more robust high speed data communications to consumers. To complicate matters for service providers, there are many different high speed data communication services being used by subscribers. For example, integrated services digital network (ISDN) services, digital subscriber line (DSL) services and European periodic pulse metering (PPM), or Teletax, services, are some of the current methods commonly used to transmit data.

To further complicate matters, many of these methods are subdivided into different types. For example, the DSL family of high speed data communications consists of a host of various services, which are typically designated as xDSL where "x" represents one of the family of DSL services. Current xDSL services include Asymmetric DSL (ADSL), Rate adaptive DSL (RADSL), High bit rate DSL (HDSL), Very high speed DSL (VDSL) and symmetric DSL (SDSL), HDSL2 and SHDSL. As is known in the art, HDSL operates over two twisted cable pairs, while HDSL2 operates over a single twisted cable pair. For further details of providing xDSL services and systems for providing these services, the reader is directed to U.S. Pat. No. 6,144,659, entitled "Telecommunications Equipment Support of High Speed Data Services", issued on Nov. 7, 2000 to Nye and Posthuma and U.S. patent application Ser. No. 09/258,879, entitled "Telecommunication Equipment Support of ISDN Communication Lines for High Speed Data Transmission", filed on Feb. 25, 1999 by Posthuma, the disclosures of which are hereby incorporated by reference.

In addition, a large percentage of consumers still use plain old telephone service (POTS) lines for data communications. Therefore, the telecommunications systems of the service providers need to support a wide variety of telecommunications services. Currently, telecommunications systems would, for example, incorporate separate circuits and devices for the separate services.

In particular, current xDSL line cards are directed to either symmetric or asymmetric applications. As those skilled in the art will readily comprehend, "symmetric" and "asymmetric" refer to the bandwidth in each direction of the communication. If the bandwidths are substantially equal in both directions, the service is termed "symmetric". If the bandwidths are not equal, the service is termed "asymmetric".

Line cards, for example, supporting symmetric applications for such xDSL, technologies as HDSL2 and SDSL have not supported concurrent operation with POTS. Line cards are known which provide concurrent asymmetric xDSL services, such as ADSL or ADSL Lite, and POTS. Unfortunately, those line cards do not support symmetric xDSL services. Hence, different circuit packs, or line cards, are needed in the telecommunications systems for the various symmetric and asymmetric services and POTS.

Accordingly, there is thus a need in the art for a line card and method for supporting concomitant operation of POTS and asymmetric digital subscriber line services and for supporting symmetric and asymmetric digital subscriber line services.

SUMMARY OF THE INVENTION

This need is met by a line card and method in accordance with the present invention which substantially concomitantly supports POTS and asymmetric digital subscriber line services and is also capable of supporting symmetric and asymmetric digital subscriber line services. The line card includes a controller which controls the card's operation to support the appropriate services based on received instructions from external devices, from instructions from a predetermined program or from monitoring operation of the line card.

In accordance with one aspect of the present invention, a line card comprises a multiple mode circuit capable of supporting symmetric and asymmetric telecommunication services, such as xDSL services. The line card may include a POTS interface for supporting POTS service. Preferably, the line card substantially concomitantly supports POTS service and asymmetric xDSL services. The line card may comprise a xDSL interface for supporting symmetric and asymmetric xDSL telecommunication services. Preferably, the xDSL interface is capable of supporting any one of ADSL, ADSL lite, VDSL, HDSL, SDSL, HDSL2, and SHDSL.

The line card may also comprise an automatic mode circuit which substantially automatically determines which services should be supported. The automatic mode circuit may include a controller for receiving instructions regarding the services being supported and for controlling the multiple mode circuit based on the instructions. The instructions may be received from an external device, from a predetermined program or from monitoring the operation of the line card. The instructions may be received during a single communication session.

In accordance with another aspect of the present invention, a line card is provided which includes a multiple mode circuit capable of supporting POTS service, symmetric digital subscriber line services and asymmetric digital subscriber line services. Preferably, the multiple mode circuit is capable of supporting the POTS service substantially concomitant with at least one of the digital subscriber line services.

In accordance with yet another aspect of the present invention, a method for supporting POTS and asymmetric digital subscriber line services and for supporting symmetric and asymmetric digital subscriber line services on a line card is provided. The method comprising the steps of: selecting whether to support the POTS and asymmetric digital subscriber line services or whether to support the digital subscriber line services; receiving a communication signal at the line card; if POTS and asymmetric digital subscriber line services are being supported, separate POTS signals and asymmetric digital subscriber line signals in the communication signal; process the POTS and asymmetric digital subscriber line signals; if symmetric and asymmetric digital subscriber line services are being supported, separate digital subscriber line signals in the communication signal; and process the digital subscriber line signals.

These and other features and advantages of the present invention will become apparent from the following detailed description, the accompanying drawings and the appended claims.

BRIEF DESCRIPTION OF THE DRAWINGS

The foregoing and other advantages of the invention will become apparent upon reading the following detailed description and upon reference; to the drawings in which.

DETAILED DESCRIPTION OF THE INVENTION

Figure 1:
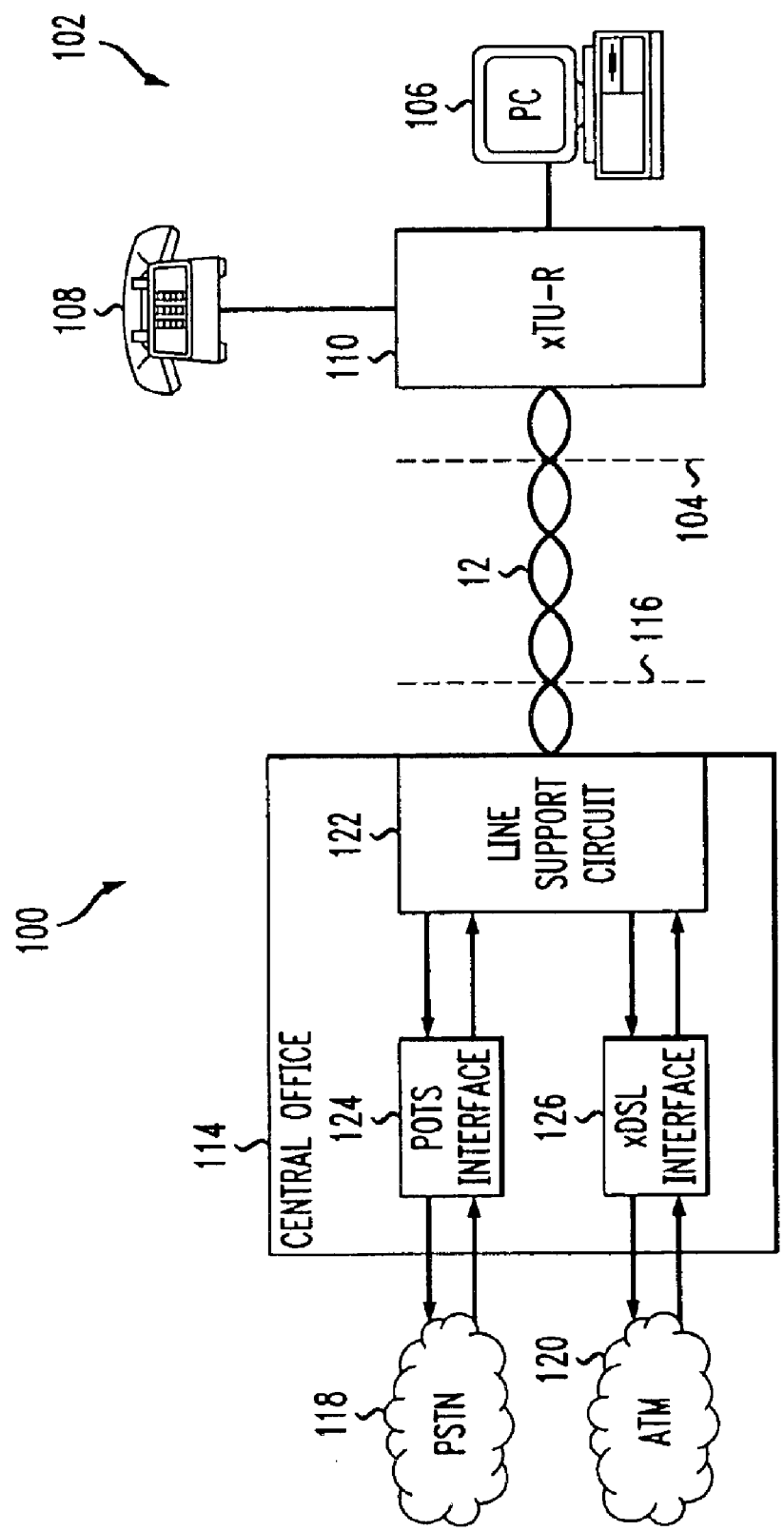
FIG. 1 is block diagram of a communication system employing a line card which supports POTS service and digital subscriber line services in accordance with the present invention.

Referring now to FIG. 1, a generic block diagram showing a communication system 100, also commonly known as a circuit pack or line card, in accordance with the present invention is provided. The present invention advantageously provides support for symmetric xDSL services, asymmetric xDSL services and POTS from a single line card, thus reducing cost and saving space in telecommunications systems. In particular, the communication system 100 supports symmetric services, such as HDSL, HDSL2, SHDSL or SDSL, asymmetric services, such as for example ADSL or ADSL Lite and POTS. The communication system 100 comprises customer premises equipment (CPE) 102, generally located right of dashed line 104. The CPE 102 is shown comprised of a personal computer (PC) 106, and a POTS telephone 108 connected to a subscriber terminating unit (xTU-R) 110. The xTU-R 110 provides an interface between incoming and outgoing communications over a subscriber line 112, such as a twisted wire pair or loop. As will be appreciated by those skilled in the art, the specific CPE 102 shown and described herein is for exemplary purposes only and other devices may be part of the CPE 102. For example, the present invention may be advantageously implemented in such systems as that disclosed in the incorporated by reference U.S. patent application to Nye et al.

A central office (CO) 114, shown generally being left of dashed line 116, comprises various terminating equipment for interconnecting the CPE 102 and a public switched telephone network (PSTN) 118 or an asynchronous transfer mode (ATM) network 120. Alternatively, network 120 could be an IP backbone. The CO 114 is shown comprised of a line support circuit 122, a POTS interface 124 and an xDSL interface 126. The POTS interface 124 provides an interface with the PSTN 118 and the xDSL interface 126 provides an interface with the ATM network 120. The line support circuit 122 interfaces the respective POTS and xDSL interfaces 124 and 126 with the subscriber line 112. The communication system 100 therefore provides both POTS and xDSL services between the CPE 102 and the respective networks 118 and 120. Communication system 100 could also provide only xDSL service between the CPE 102 and the ATM network 120. In this case, line support circuit 122 could comprise a DSL transformer.

Figure 2:
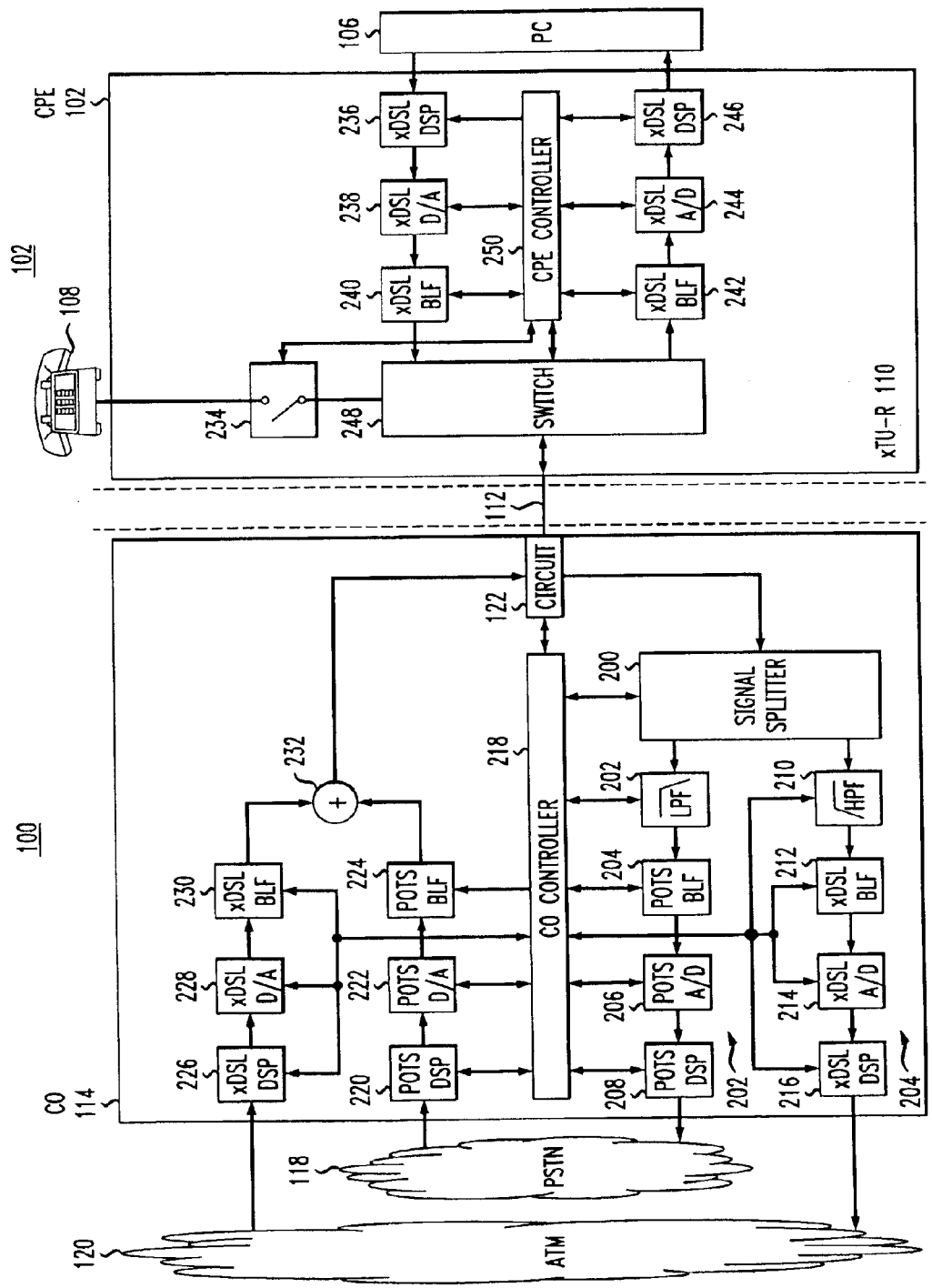
FIG. 2 is a more detailed block diagram of the communication system shown in FIG. 1.

A more detailed block diagram of the CO 114 and the xTU-R 110 is shown in FIG. 2. Communication signals, which may include symmetric services, asymmetric services and POTS, from the CPE 102 are received at the line support circuit 122. The line support circuit 122 transmits the received communication signals to a signal splitter 200 for providing the received communication signals to a receive POTS branch and a receive xDSL branch. The receive POTS branch extracts POTS signals, if present, from the received communication signals and provides them to the PTN 118. The receive xDSL branch extracts the desired xDSL signals, if present, from the received communication signals and provides them to the ATM network 120. The operation of the receive POTS and xDSL branch will be described more fully below.

The receive POTS branch consists of a receive low pass filter (LPF) 202, a receive POTS band limiting filter (BLF) 204, a receive POTS analog-to-digital converter (A/D) 206 and a receive POTS digital signal processor (DSP) 208. The receive xDSL branch is comprised of a receive high pass filter (HPF) 210, a receive xDSL BLF 212, a receive xDSL A/D converter 214 and a receive xDSL DSP 216. The line support circuit 122, the components of the receive POTS branch and the receive xDSL branch, and the signal splitter 200 are controlled by a central office (CO) controller 218. Since the basic operation of the components in the line card 100 is known in the art, conventional components and circuits have, for the most part, been illustrated in the drawings by readily understandable block representations and schematic diagrams, which show only those specific details that are pertinent to the present invention. These block representations and schematic diagrams have been employed in order not to obscure the disclosure with structural details which will be readily apparent to those skilled in the art having the benefit of the description herein.

Communication signals received from the PSTN 118 are processed by a transmit POTS branch. The transmit POTS branch comprises a transmit POTS DSP 220, a transmit POTS D/A converter 222, and a transmit POTS BLF 224. Communication signals received from the ATM network 120 are processed by a transmit xDSL branch. The transmit xDSL branch is comprised of a transmit xDSL DSP 226, a transmit xDSL D/A converter 228 and a transmit xDSL BLF 230. The communication signals processed by the transmit POTS branch and the transmit xDSL branch are summed by a summer 232 and provided to the line support circuit 122 for transmission to the CPE 102 over the line 112.

The line card 100 of the present invention thus supports symmetric services, asymmetric services and POTS. The POTS interface 124 many be comprised of the transmit and receive POTS branches, the signal splitter 200, the CO controller 218 and the summer 232 to provide POTS service between the PSTN 118 and the CPE 102. The xDSL interface 126 may be comprised of the transmit and receive xDSL branches, the signal splitter 200, the CO controller 218 and the summer 232 to provide xDSL services between the ATM network 120 and the CPE 102.

At the CPE 102, POTS communication signals are generated and received by the telephone 108. The POTS signals are provided to the telephone 108 via a switch 234. The switch 234 provides selective communications between the telephone 108 and the subscriber line 112. The PC 106 transmits and receives the xDSL signals over respective CPE transmit branch and CPE receive branch. The CPE transmit branch is comprised of a CPE xDSL DSP 236, a CPE xDSL D/A converter 238 and a CPE xDSL BLF 240. The CPE receive branch is comprised of a CPE xDSL BLF 242, a CPE xDSL A/D converter 244 and a CPE xDSL IDSP 246. A hybrid switch 248 interconnects the CPE receive and transmit branches with the subscriber line 112. The switch 234, the CPE transmit and receive branches and the hybrid switch 248 are controlled by a CPE controller 250.

The operation of the communication system 100 in accordance with the present invention will now be described with reference to FIG. 2. The present invention advantageously operates in various configurations depending upon the communication signal formats being employed. For example, the present invention advantageously supports xDSL services or POTS and asymmetric xDSL services. The services supported by the present invention can be selected manually or may be selected automatically and dynamically, as described more fully below.

In accordance with one aspect of the present invention, xDSL services and POTS services are supported from a single line card, or circuit pack. These services may consist of, for example, ADSL, ADSL lite or VDSL in combination with POTS. In such a situation, a direct current (DC) feed is provided by the line support circuit, in a known manner and under the control of the CO controller 218, to support the POTS communications. The CO controller 218 turns on the components of the transmit and receive POTS branches. In particular, the signal sputter 200 is activated to split communication signals received over the subscriber line 112 into two signals, a POTS branch signal and a xDSL branch signal. At the CPE 102, the CPE controller 250 closes the switch 234 to connect the telephone 108 to the subscriber line 112. A POTS communication path is thus established between the telephone 108 and the PSTN 118.

The receive POTS LPF 202 removes any high frequency components in the POTS branch signal, such as xDSL signals. This essentially separates out the POTS signals in the POTS branch signal. The filtered POTS branch signal is further filtered by the receive POTS BLF 204. The receive POTS LPF 202 may be set at a cutoff frequency of around 4 kHz. For purposes of this invention, however, the two filters 202 and 204 may be tuned in any number of known manners, since the particular tuning of the filters 202 and 204 is not important except for being appropriate for extracting POTS signals from the POTS branch signal. The POTS signal, which is analog, is then converted into a digital POTS signal. The digital POTS signal is processed by the receive POTS DSP 208 and sent to the PSTN 118. The receive POTS DSP 208 may performing any number of known digital signal processing techniques on the digital POTS signal, such as for example, echo cancellation, voice monitoring and the like. The processed digital signal is then transmitted over the PSTN 118.

The present invention advantageously supports asymmetric xDSL, such as ADSL, ADSL lite and VDSL, concomitant with POTS. The signal splitter 200, as previously indicated, splits the received communication signal into a xDSL branch signal. The xDSL branch signal is provided to the receive xDSL HPF 210 which blocks the lower frequency POTS signals and passes the higher frequency xDSL signals. The receive xDSL HPF 210 may have, for example, a cutoff frequency of around 16 kHz. The xDSL signal is then provided to a receive xDSL BLF 212 which has a frequency bandwidth controlled by the CO controller 218. The CO controller 218 adjusts the frequency bandwidth depending upon which of the xDSL services are being received. For example, from the CPE 102 to the CO 114, or in the "upstream" direction, ADSL and ADSL lite would include signals in the range of approximately 26 kHz to 134 kHz. For VDSL, several bandplans including the 997 and 998 bandplans could be chosen. The frequency range of the receive xDSL BLF 212 may be set for any appropriate service. The xDSL signal of the desired service is provided to the receive xDSL A/D converter 214 and the receive xDSL DSP 216 before being transmitted to the ATM network 120. The CO controller 218 may provide, or download, the proper code to the receive xDSL DSP 216 for the xDSL service being supported. Alternatively, a number of codes for different xDSL services may be resident in the receive xDSL DSP 216 and the CO controller 218 may select the proper code to execute.

In accordance with one aspect of the present invention, a line card may support POTS service, as discussed above, and one of a plurality of xDSL services. By adjusting the frequency range of the receive xDSL BLF 212, different xDSL services may be supported. The CO controller 218 preferably controls the frequency range of the receive xDSL BLF 212 to support the appropriate service. The CO controller 218 may be preprogrammed to support a particular xDSL service or set of services. The CO controller 218 may preferably dynamically adjust the frequency range of the receive xDSL BLF 212. The CO controller 218 could sample information received in communication signals received from the CPE 102 to determine which xDSL service should be supported and thus, determine the appropriate frequency range of the xDSL BLF 212. For example, the CO controller 218 may access handshake information, such as contained in the G.990 series of specifications from the International Telecommunications Union, indicating which xDSL service will be used. The CO controller 218 would then set the frequency range of the xDSL BLF 212 based on the information received in the handshake. Based on which xDSL service was identified the CO controller 218 would download the appropriate code to the xDSL BLF 212 to set the desired frequency range.

For xDSL signals traveling downstream (from the ATM network 120 to the CPE 102), the xDSL signals are processed by the transmit xDSL DSP 226 which is controlled by the CO controller 218 and then converted to an analog xDSL signal by the transmit xDSL D/A converter 228. The analog xDSL signal is filtered by the transmit xDSL BLF 230 (whose frequency range is controlled by the CO controller 218) and then combined with any POTS signals being transmitted by the summer 232. This combined signal is then transmitted by the line support circuit 122 over the subscriber line 112 to the CPE 102. The CO controller 218 controls the frequency range of the transmit xDSL BLF 230 in a manner similar to that described above with respect to the receive xDSL BLF 212. Additionally, the CO controller 218 also controls the operation, via code, of the transmit xDSL DSP 226 as described above with respect to the receive xDSL DSP 216.

In accordance with another aspect of the present invention, the line card 100 may support one of a plurality of xDSL symmetric and asymmetric services. The line card 100 supports, for example and not limitation, SDSL, HDSL, HDSL2, SHDSL, ADSL, ADSL lite and VDSL. In supporting these services, the DC feed from the line support circuit 122 is turned off, since no POTS service is required. All the POTS elements, namely the receive and transmit POTS DPSs 208 and 220, the receive and transmit POTS A/D and D/A converters 206 and 222, the receive and transmit POTS BLFs 204 and 224 and the receive POTS LPF 202, are turned off. The signal splitter 200 is disconnected so that the received communication signal is not split, but is instead transmitted directly to the receive xDSL branch. The receive xDSL HPF 210 is turned off so that all frequencies in the received communication signal are provided to the receive xDSL BLF 212.

The CO controller 218 sets the frequency range of the receive xDSL BLF 212 based on which xDSL service is being supported. As noted above, the CO controller 218 may be preprogrammed to select a particular xDSL service or may select the xDSL service dynamically based on information contained in the received communication signals. The filtered xDSL signal is then converted to a digital xDSL signal by the receive xDSL A/D converter 214 and the digital xDSL signal is processed by the receive xDSL DSP 216. As noted above, the CO controller 218 may download the appropriate code to the xDSL DSP 216 or the CO controller 218 may activate the appropriate code resident on the xDSL DSP 216. The CO controller 218, the line support circuit 122, the signal splitter 200, the summer 232 and the receive and transmit POTS and xDSL branches form a multiple mode circuit capable of supporting asymmetric and symmetric telecommunications services and capable of supporting POTS and xDSL services.

In accordance with the present invention, switching between different symmetric and asymmetric services or operating modes may be accomplished in a number of manners. As noted above, the CO controller 218 may switch operating modes based on information, or an order, received from the CPE 102. For example, a subscriber may have placed a voice call and concomitantly be surfing the Internet using a first xDSL service, such as ADSL. The subscriber terminates the POTS call and decides to change the Internet connection from the first xDSL service to a second xDSL service, such as SHDSL. The subscriber, or the CPE 102 then sends a reconfigure signal to the CO 114 requesting the change in operating mode. As noted above, the reconfigure signal may be sent as a direct message or in a message channel of ATM or other layer. In the middle of a communication session, the reconfigure signal may be sent in the handshake format discussed above. Those skilled in the art will readily appreciate that these examples of methods for providing instructions to change the operating mode of the line card 100 are for illustration only, and any method may be employed in accordance with the present invention so long as the line card 100 receives an order to change its configuration. In response to the request to reconfigure, the CO controller 218 adjusts the appropriate components of the line card 100.

Additionally, the CO controller 218 monitors substantially all of the components of the line card 100 and based on operation of the components may be programmed to automatically change the operating mode. For example, the CO controller 218 may detect that some signals require a larger bandwidth than was originally provided. The CO controller 218 may then instruct the BLFs 212 and 230 to increase their frequency ranges. The CO controller 218 thus comprises an automatic mode circuit for substantially automatically determining which operating mode is being supported, or for changing operating modes based on a predetermined criteria.

As one of ordinary skill in the art would understand, some form of hybrid 2 wire to 4 wire conversion and cancellation techniques, and some form of setting termination impedances would necessarily also take place in CO 114.

Figure 3:
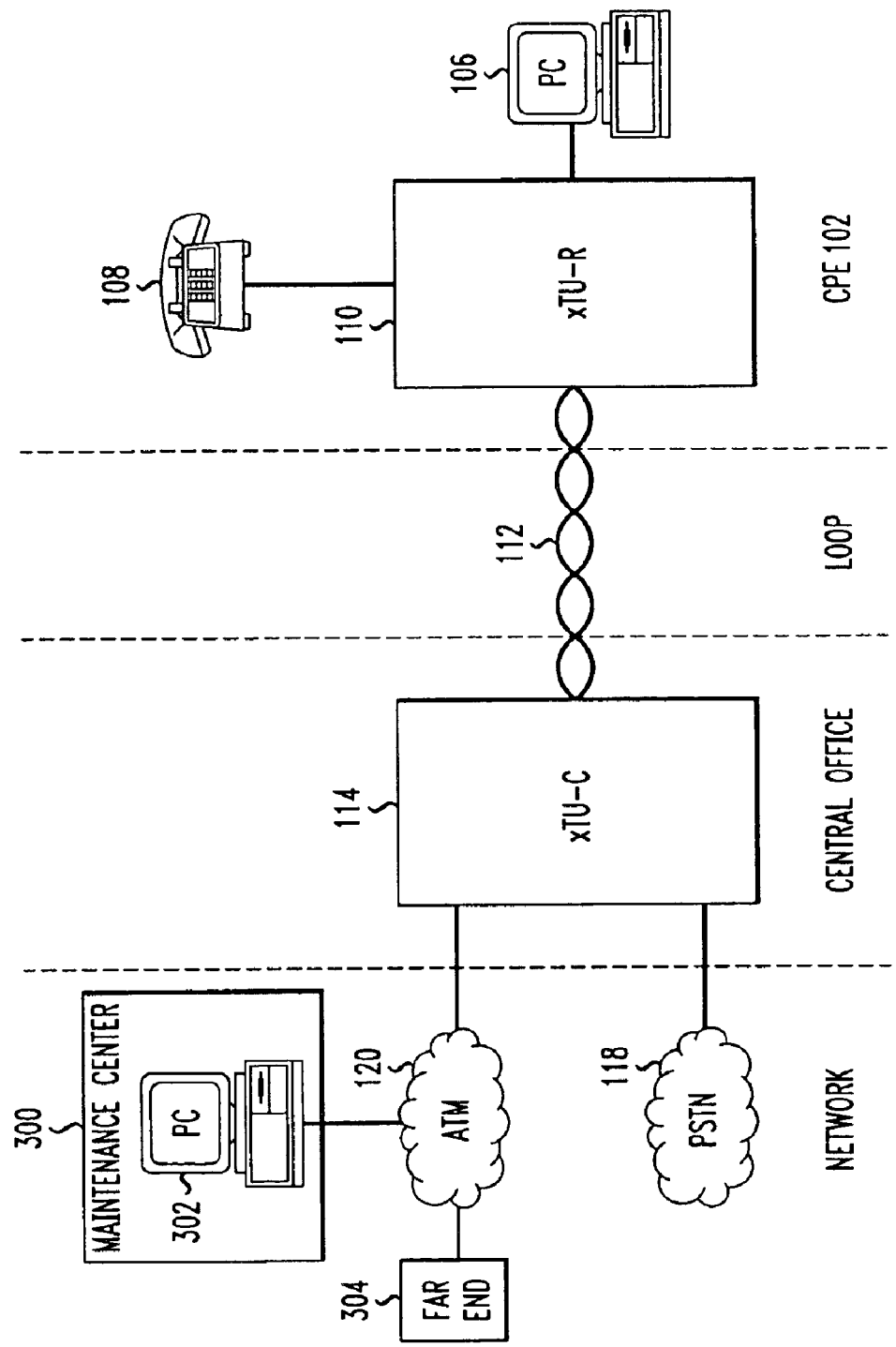
FIG. 3 is a block diagram of the communication system as shown in FIG. 1 further including external devices.

A further method for changing operating modes in accordance with an aspect of the present invention is illustrated in FIG. 3. A maintenance center 300 including a computing device, such as PC 302, may provide instructions to the CO controller 218 to change operating modes through the ATM network 120. Alternatively, or additionally, a far end device 304, or system, may instruct the CO controller 218 to change operating modes. The maintenance center 300 and the far end device 304 may desire a change in operating mode due to any number of factors including network load, device capabilities, service contracts and the like. The maintenance center 300, the far end device 304 and the CPE 102 are all external devices which are capable of indicating to the CO controller 218 that a change in the operating mode, or services, is desired.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modification, equivalents and alternatives falling within the spirit and scope of the invention as defined by the following appended claims.

What is claimed is:

1. A line card for a telecommunications system comprising:
   a multiple mode circuit capable of supporting symmetric and asymmetric telecommunication services;
   wherein the multiple mode circuit comprises:
      a POTS interface for supporting POTS service; and
      an xDSL interface for supporting symmetric and asymmetric xDSL services;
   wherein the multiple mode circuit selects whether to support the POTS and asymmetric digital subscriber line services or whether to support the digital subscriber line services;
   wherein the multiple mode circuit receives a communication signal;
   wherein the multiple mode circuit separates and processes POTS signals and asymmetric digital subscriber line signals in the communication signal if POTS and asymmetric digital subscriber line services are being supported;
   wherein the multiple mode circuit separates and processes digital subscriber line signals in the communication signal if symmetric and asymmetric digital subscriber line services are being supported.

2. The line card as recited in claim 1 wherein the xDSL interface is capable of supporting any one of asymmetric digital subscriber line service, asymmetric digital subscriber line lite service, very high speed digital subscriber line service, symmetric digital subscriber line service, high bit rate digital subscriber line service, single pair symmetric digital subscriber line service, HDSL2 and SHDSL.

3. The line card as recited in claim 1 wherein the multiple mode circuit substantially concomitantly supports POTS service and asymmetric digital subscriber line services.

4. The line card as recited in claim 3 wherein the xDSL interface is capable of supporting any one of asymmetric digital subscriber line service, asymmetric digital subscriber line lite service and very high speed digital subscriber line service.

5. The line card as recited in claim 1 wherein the multiple mode circuit comprises:
   an automatic mode circuit which substantially automatically determines which symmetric and asymmetric services should be supported.

6. The line card as recited in claim 5 wherein the automatic mode circuit comprises:
   a controller for receiving instructions regarding the services being supported and for controlling the multiple mode circuit based on the instructions.

7. The line card as recited in claim 6 wherein the controller receives the instructions from external devices.

8. The line card as recited in claim 5 wherein the controller is capable of changing the services being supported during a communication session.

9. The line card as recited in claim 8 wherein the controller changes the services being supported during a communication session based on information received via a handshake signal.

10. The line card as recited in claim 5 wherein the automatic mode circuit comprises a controller for monitoring the multiple mode circuit, for determining which one of the services should be supported based on operation of the multiple mode circuit, and for instructing the multiple mode circuit to support the one of the services.

11. The line card for the telecommunications system of claim 1, wherein the xDSL interface comprises a central office controller, a transmit xDSL branch, and a receive xDSL branch;

wherein the central office controller controls the transmit xDSL branch and the receive xDSL branch to support the symmetric and asymmetric xDSL services.

12. The line card for the telecommunications system of claim 11, wherein the transmit xDSL branch comprises a transmit xDSL digital signal processor, a transmit xDSL digital-to-analog converter, and a transmit xDSL band limiting filter;

wherein the receive xDSL branch comprises a signal splitter, a receive high pass filter, a receive xDSL band limiting filter, a receive xDSL analog-to-digital converter, and a receive xDSL digital signal processor.

13. A line card for a telecommunications system comprising:

a multiple mode circuit capable of supporting POTS service, symmetric digital subscriber line services and asymmetric digital subscriber line services;

wherein the multiple mode circuit selects whether to support the POTS and asymmetric digital subscriber line services or whether to support the digital subscriber line services;

wherein the multiple mode circuit receives a communication signal;

wherein the multiple mode circuit separates and processes POTS signals and asymmetric digital subscriber line signals in the communication signal if POTS and as metric digital subscriber line services are being supported;

wherein the multiple mode circuit separates and processes digital subscriber line signals in the communication signal if symmetric and asymmetric digital subscriber line services are being supported.

14. The line card as recited in claim 13 wherein the multiple mode circuit is capable of supporting the POTS service substantially concomitant with at least one of the digital subscriber line services.

15. The line card as recited in claim 14 wherein the at least one of the digital subscriber line services is any one of asymmetric digital subscriber line service, asymmetric digital subscriber line lite service and very high speed digital subscriber line service.

16. The line card as recited in claim 13 wherein the multiple mode circuit is capable of supporting symmetric digital subscriber line services.

17. The line card as recited in claim 16 wherein the symmetric digital subscriber line services is any one of high bit rate digital subscriber line service and single pair symmetric digital subscriber line service.

18. A method for supporting POTS and asymmetric digital subscriber line services and symmetric digital subscriber line services on a line card comprising the steps of:

selecting whether to support the POTS and asymmetric digital subscriber line services or whether to support the digital subscriber line services;

receiving a communication signal at the line card;

if POTS and asymmetric digital subscriber line services are being supported, separate POTS signals and asymmetric digital subscriber line signals in the communication signal;

process the POTS and asymmetric digital subscriber line signals;

if symmetric and asymmetric digital subscriber line services are being supported, separate digital subscriber line signals in the communication signal; and process the digital subscriber line signals.

19. The method as recited in claim 18 wherein the step of selecting whether to support comprises the step of:

receiving instructions from an external device regarding which of the POTS and asymmetric digital subscriber line services or which of the symmetric or asymmetric digital subscriber line services to support.

20. The method as recited in claim 19 wherein the step of receiving instructions comprises the step of:

receiving the instructions in a handshake signal.

21. The method as recited in claim 20 wherein the step of receiving the instructions comprises the step of:

receiving the instructions in a handshake signal during a communication session.

22. The method as recited in claim 18 wherein the step of selecting whether to support comprises the steps of:

monitoring operation of the line card; and selecting whether to support POTS and asymmetric digital subscriber line services or whether to support symmetric digital subscriber line services based on the operation of the line card.

23. The method as recited in claim 18 wherein the asymmetric digital subscriber line service comprises any one of asymmetric digital subscriber line service, asymmetric digital subscriber line lite service and very high speed digital subscriber line service.

24. The method as recited in claim 18 wherein the symmetric digital subscriber line services comprises any one of high bit rate digital subscriber line service and single pair symmetric digital subscriber line service.

* * * * *